Sept. 10, 1957
C. W. BAIRD
2,805,677
DETECTOR FOR MISALINEMENT OF ROTATING BODY
Filed April 23, 1953
2 Sheets-Sheet 1
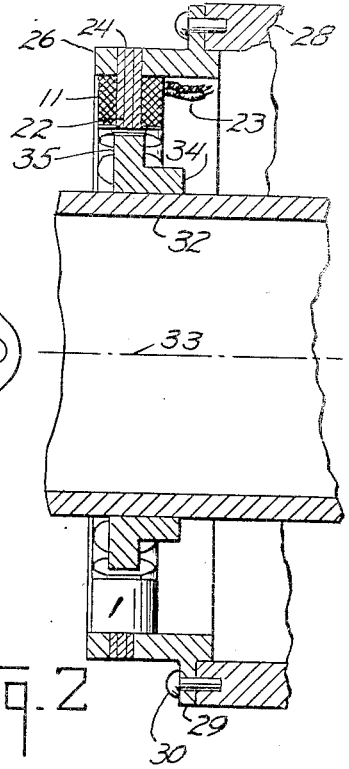
Fig.2
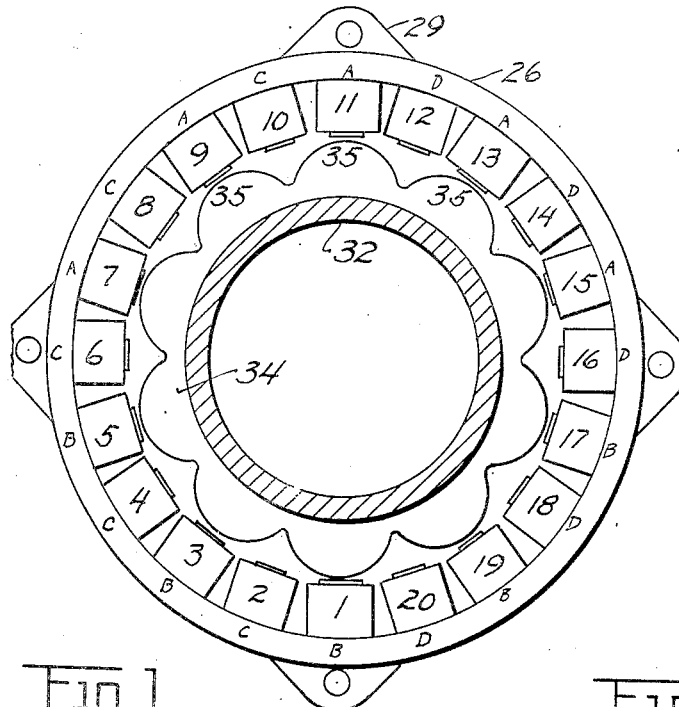
Fig.1
Fig.3
INVENTOR.
CLYDE W. BAIRD
Godfrey B. Speir
BY
ATTORNEY Sept. 10, 1957     C. W. BAIRD     2,805,677
DETECTOR FOR MISALINEMENT OF ROTATING BODY
Filed April 23, 1953     2 Sheets-Sheet 2

INVENTOR.
CLYDE W. BAIRD
BY Godfrey B. Spear
ATTORNEY

United States Patent Office 2,805,677
Patented Sept. 10, 1957

2,805,677

DETECTOR FOR MISALINEMENT OF ROTATING BODY

Clyde W. Baird, Hohokus, N. J., assignor to Curtiss-Wright Corporation, a corporation of Delaware Application April 23, 1953, Serial No. 350,711

3 Claims. (Cl. 137—31)

This invention relates to instruments for the detection of errors in alinement of shafting and other forms of rotating members and rotating bodies. It is particularly suitable for indicating the wear in bearings for very high speed mechanisms and is also adapted for the indication of overspeed conditions in high speed mechanisms.

The invention is adapted for use in high speed turbine apparatus wherein excessive bearing wear or failure of some of the turbine components could easily result in extreme damage. Although of particular utility in turbine applications, the invention is not confined to such applications.

In general, the invention comprises a small alternating current generator having a multiplicity of stationary generating coils which are connected in selected groups. These coils cooperate with a rotor of magnetic material having a plurality of lobes or pole pieces, the rotor being secured to a rotating shaft member whose deviations from true-running alinement are to be sensed. The generator coils feed a circuit system and indicator and the connections are so arranged that when the shaft is running true, the electrical output of the system is negligible. If shaft misalinement or vibration may occur for any reason, such as through undue wear of bearings in which the shaft is supported, the generator and circuit system produces a significant output which may be indicated on an appropriate meter or utilized for automatic control purposes. The automatic control arrangement for instance, might be utilized for shutting down the rotating system to avoid failure.

The same generator may also be used for speed sensing of the rotary shaft system, particularly for indicating overspeed of the system whereby shutdown of the system may be accomplished either manually or automatically as the overspeed indication is observed or sensed.

The details of a typical and exemplary arrangement of the invention are shown in the attached drawings and are described below. In the drawings, in which similar reference characters indicate similar parts, Fig. 1 is an end elevation of a generator according to the invention;

Fig. 2 is a longitudinal section through the generator associated with a rotating shaft system;

Fig. 3 is a schematic diagram of the circuit used in conjunction with the generator;

Figure 4:
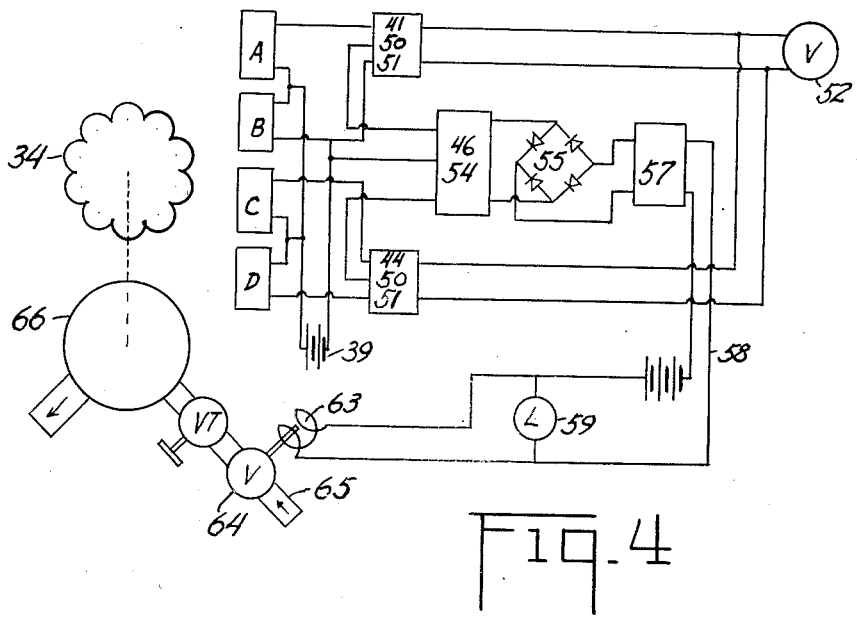
Fig. 4 is a schematic diagram of the invention as modified to provide an automatic overspeed control.

In Fig. 1, I show a plurality of wire coils 1 through 20, each of which as shown in Fig. 2 is wound upon a magnetic laminated core 22 and is provided with coil leads 23. The cores 22 are formed as part of a laminated ring 24, secured to a ringlike stator member 26 which may be secured to a stationary part of the machine system such as 28, through a mounting flange 29 and securing means 30. The inner ends of the several cores 22 of the coils 1–20 are tangent to a circle whose center lies on the precise center of rotation of a shaft or other rotating member 32. This shaft is supported in suitable bearings, not shown. When the shaft bearings or supports become worn, or for other reasons, the shaft 32 may run eccentrically to its normal axis of rotation 33. Upon the shaft 32 is mounted a rotor 34 of magnetic material, the periphery of the rotor being formed as a plurality of lobes or pole pieces 35, the outer rims of the lobes 35 running close to the ends of the cores 22 of the several coils 1–20. Under normal operating conditions, the lobes have a uniform air gap as they pass the cores of the several coils so that each coil will generate an electrical impulse of uniform amount if the coils are appropriately excited. The rotor 34 may be permanently magnetized to provide excitation or, extraneous excitation may be used in the coils 1–20 as will be described. If the shaft runs eccentrically from its true center, the air gap between certain of the pole pieces of the coils 1–20 and of the lobes 35 will be non-uniform so that certain of the coils 1–20 will generate higher voltage and certain of them will generate lower voltage.

These differentials in electrical generation are sensed in a manner to indicate untrue operation of the shaft 32, as will now be described.

Referring to Fig. 3, the several coils 1–20 are indicated on the left hand side of the figure. The coils are divided into four groups of odd and even numbers, one odd numbered group A of coils defining substantially a semicircle above the horizontal diameter in Fig. 1 and the other odd numbered group B defining substantially a semicircle below the horizontal diameter in Fig. 1. Group A thus constitutes coils 7, 9, 11, 13 and 15 and group B constitutes coils 5, 3, 1, 19 and 17. Of the third and fourth groups C and D, group C the third comprises coils 10, 8, 6, 4 and 2 lying to the left of a vertical diameter through Fig. 1 and the fourth group D constitutes the coils 12, 14, 16, 18 and 20 lying to the right of a vertical diameter through Fig. 1. If the shaft is running eccentrically to the left of center in Fig. 1, the coils of group C will generate a larger voltage due to the close air gap and the coils of group D will generate a lesser voltage. The coils of groups A and B will generate the same voltage since the average air gap between the rotor and the coils of groups A and B remains substantially the same.

If the shaft is displaced vertically upward or downward, the coils of groups A or B will generate differential voltages while the coils of groups C and D will generate substantially the same voltage. If shaft displacement is on an angle to the horizontal or vertical, there will be differential generation between groups A and B and between groups C and D. Any differential generation is sensed by the circuit system.

The coils of each group are arranged in series and are excited by a direct current source 38 which may be turned on or off by a switch 39. The positive side of the source 38 is connected to one end of each of the four groups of coils.

The other end coil of group A is connected at 40 to the primary of a transformer 41. The other end coil of group B is connected at 42 to the other end of the transformer primary 41. In similar fashion, the other end coil of group C is connected at 43 to the primary of a transformer 44, and the other end coil of group D is connected at 45 to the other end of the primary of transformer 44. The transformers 41 and 44 are center tapped, the two center taps being connected to the ends of a primary transformer 46 at 47 and 48. The primary of transformer 46 is center tapped at 49, this being connected to the switch 39 to complete the D. C. exciting circuit through all of the coils 1–20.

The voltages generated by coil groups A and B will be opposite in polarity to the voltages generated by coil groups C and D due to the alternate relationship of the odd and even numbered coils. Through the D. C. excitation of the coils, all of the odd numbered cores 22 will be north, and all of the even numbered cores 22 will be south, for instance.

When the rotor 34 rotates and its pole pieces 35 move across the cores of the coils 1–20, each coil will generate an electrical pulse. The simultaneous pulses of the odd numbered coils will be transmitted to the primary of the transformer 41, and the pulses generated by the even numbered coils will be transmitted to the primary of the transformer 44. The coils of groups A and B will generate at the same polarity but since the groups are connected to opposite ends of the primary of transformer 41, the voltages of these groups will tend to balance each other and the transformer 41 will have no output unless the rotor runs eccentrically. In the same fashion, the coils of groups C and D are connected to opposite ends of the primary of transformer 44 and the voltages generated by these groups will tend to balance each other so that the transformer 44 will have no output unless the rotor runs eccentrically.

For example, coils 1 and 11, respectively in group B and A, generate simultaneously with the same polarity. Coil 1, connected to the transformer at 42, and coil 11, connected to the transformer at 40, will impress a positive voltage at opposite ends of the transformer primary, these voltages balancing one another if they are the same. If they are different, due to eccentricity, the difference in generated voltages will energize the transformer 41 and will produce an output pulse in the secondary of the transformer.

The succession of pulses produced at the secondaries of the transformers 41 and 44 are passed through frequency compensating networks 50, comprising resistors and capacitors, which will cause net transformer output voltage to be independent of the frequency of the input to the transformer. It will be appreciated that, with varying speeds of rotor 32, the generator will normally produce frequencies and voltages proportional to rotor speed. These voltages are limited by the compensating networks 50 to avoid the production of ambiguous readings.

The pulses comprising the outputs from networks 50 are rectified at 51 to produce pulsating D. C. The outputs from both sets of rectifiers are connected by appropriate wiring to a voltmeter 52, shunted by a capacitor 51a to smooth out the pulsating D. C. ripple. The meter 52 will produce a reading only when there is differential voltage generation between coil groups A and B, or between coil groups C and D.

As inferred heretofore, if the shaft 32 is running true, the net current produced by the generator is zero or substantially zero within manufacturing limits of the system. Thus, the meter 52 will register zero, or a low reading. If there is eccentricity, either steady state or vibrative, in the shaft 32, the generator will produce a net output, which through the circuit system, produces a finite positive reading on the meter 52 to indicate that the shaft system is not running true. The meter may be calibrated for amount of shaft runout, or marked with a green zone and a red zone respectively indicating operation of the shaft system within, or outside of tolerable limits.

A plurality of generators and circuits such as that of Fig. 3 may all be connected if desired into the same meter 52, other connections from similar circuits being indicated at 53.

The generator and circuit system may be utilized to provide speed indication or overspeed indication. It will be seen that the transformer 46 is so connected to the coils 1–20 and to the transformers 41 and 44 that it will receive generated pulses at a frequency proportional to shaft speed and at a voltage proportional to the average voltage of groups A and B on the one hand, and of groups C and D on the other hand. The frequency and energy received by the transformer 46 will be proportional to shaft speed. The transformer 46 feeds a high pass filter network 54 whose output is rectified in a full wave rectifier 55 which in turn is connected to a solenoid 56 of a sensitive relay 57. The solenoid 56 is selected to operate the relay 57 at a certain voltage, which voltage is selected to represent the desired top speed limit of the shaft system. Due to the characteristics of the filter 54, when such speed is approached, the voltage impressed on the solenoid 56 increases rapidly to the necessary amount to operate the relay 57, closing a circuit 58 to operate a warning device such as a lamp 59. The relay 57 and circuit 58 may be arranged for latching so that the overspeed indication will be maintained. One of various means of accomplishing latching is to include in the circuit 58 a second relay solenoid 60 which is energized upon relay operation and which acts as a holding coil to hold the relay closed and to maintain the indicator in an indicating state of operation. A normally closed switch 61, forming part of the circuit 58, may be opened to reset the circuit after overspeed has occurred.

The indicating lamp 59 may be replaced by any other appropriate indicator or by an automatic control arrangement of some sort by which the overspeed condition may be stopped or by which the rotating system may be shut down. The same indicating system may be utilized for overspeed indication derived from other generators of a multiple system, as through connections 62.

Figure 4 shows a circuit system like that of Fig. 3 adapted to shut down a rotating system upon the existence of an overspeed. Reference characters of the circuit system are the same as those used for analogous components of the system of Fig. 3. The circuit 58 of the relay 57 includes the indicating lamp 59 and also includes a solenoid 63 operating a shut-off valve 64. The valve 64 may be placed in a fuel line 65 feeding a turbine 66, the latter driving the rotor 34 associated with the several generating coils 1–20.

Figures 5, 6:
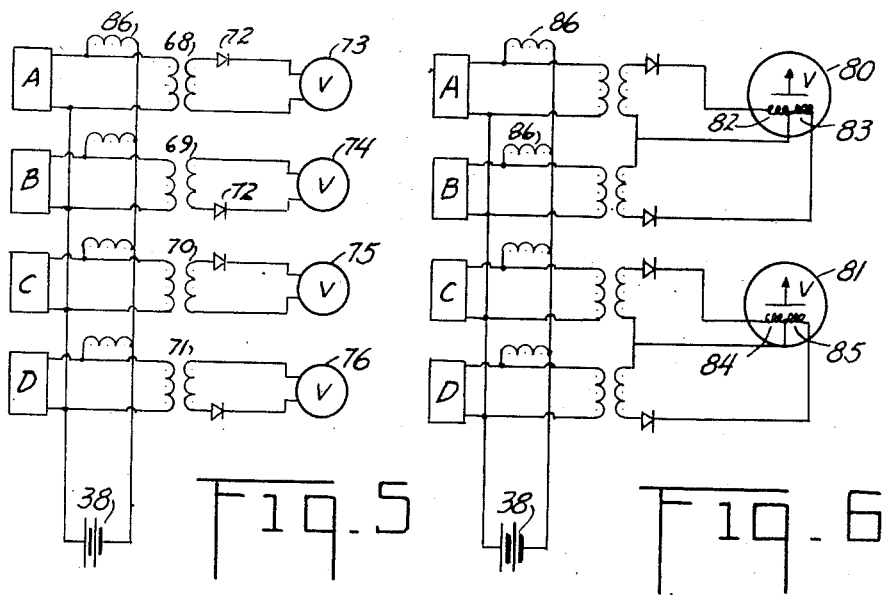
Fig. 5 is a modification of the invention for indicating direction of shaft eccentricity.
Fig. 6 is another modification of the invention adapted to indicate direction of shaft eccentricity.

The generating and indicating system of this invention may readily be modified to indicate the direction of eccentricity of the rotating system by utilizing multiple indicators instead of a single indicator. Fig. 5 shows such a modification of the system wherein each group of coils A, B, C and D energizes the primary of its own transformer 68, 69, 70 and 71 respectively. The secondaries of these transformers are connected through rectifiers 72 to individual indicators 73, 74, 75 and 76 respectively. Under normal operating conditions the several indicators would yield a positive finite reading of substantially the same value. Upon eccentric running of the shaft, one or two of the indicators would read high, in the direction of the eccentric running, and the other indicators would read low.

Alternatively, center zero meters could be used, wherein right or left needle swings would show right or left shaft deflections. Fig. 6 shows two center zero indicators 80 and 81. The meter 80 has a winding 82 associated with and energized by a generating coil group A. It also has a winding 83 associated with and energized by coil group B. The meter 81 has a coil 84 associated with and energized by coil group C and a winding 85 similarly connected with coil group D. The connections from each coil group to its indicator coil are generally of the same sort as shown in Fig. 5, including transformers and rectifiers. The meters 80 and 81 under normal operating conditions would each read zero and upon eccentric running of the generator shaft, would swing to right or left in proportion to the difference in energization of the meter coils.

In Figs. 5 and 6, as in the circuit of Fig. 3, magnetization of the generator rotor is afforded by D. C. excitation of the coils of respective groups from a power source 38 which, in general, is connected in parallel to the respective coil groups through chokes or resistors 86.

Also, the circuit system could be arranged in rather obvious manner to yield a signal magnitude showing amount of eccentricity as well as direction thereof. In such a system vibration of the shaft might cause erratic readings on the several meters, which symptom would obviously show a vibration condition.

Though several embodiments of the invention are shown, it is to be understood that the invention may be applied in other forms and in various environments. Changes may be made in the arrangements shown without departing from the spirit of the invention. Reference should be had to the appended claims for definition of the limits of the invention:

What is claimed is:

1. An alinement error sensing system for a rotating body comprising a multi-lobed rotor of magnetic material on the body, a stator embracing said rotor with respect to which the rotor may at times rotate on an eccentric axis, said stator comprising a plurality of stator coils secured thereto and spaced therearound in electromagnetic relation to said lobes, said coils being interconnected in groups, each group embracing a different segment of the circumference of said stator, D. C. power means connected to excite said coils and thus to induce magnetism in said rotor, means connected to said coil groups connecting opposite groups of coils in opposition to one another, means connected to said coil groups to eliminate voltage rise generated thereby due to rotor speed, and means connected to said coil groups to sense and indicate the net electrical voltage of the different interconnected groups of coils to provide an indication of rotor misalinement.

2. An alinement sensing system for a rotating body comprising a multi-lobed rotor of magnetic material on the body, a stator embracing said rotor with respect to which the rotor may at times rotate on an eccentric axis, a plurality of generating coils secured to and spaced around and within said stator, each having a pole-piece, said rotor lobes moving across said pole pieces during rotor rotation, D. C. power means connected to excite said coils thus to induce magnetism in said rotor whereby, as said lobes move across said pole pieces said coils generate electrical pulses, means interconnecting groups of said coils in series, one group lying opposite a second group, a third group overlapping said first two groups and a fourth group lying opposite said third group and overlapping said first two groups, means connecting the first two groups together in electrical opposition, means connecting the last two groups together in electrical opposition, and means connected to said groups to indicate the net output of said connected groups as a function of rotor eccentricity.

3. An alinement and speed error sensing system for a rotating body comprising a multi-lobed rotor of magnetic material on the body, a stator embracing said rotor with respect to which the rotor may at times rotate on an eccentric axis, a plurality of generating coils secured to and spaced around and within said stator, each having a pole-piece, said rotor lobes moving across said pole pieces during rotor rotation, D. C. power means connected to excite said coils thus to induce magnetism in said rotor whereby, as said lobes move across said pole pieces said coils generate electrical pulses, means interconnecting groups of said coils in series, one group lying opposite a second group, a third group overlapping said first two groups and a fourth group lying opposite said third group and overlapping said first two groups, means connecting the first two groups together in electrical opposition, means connecting the last two groups together in electrical opposition, means connected to said groups to indicate the net output of said connected groups as a function of rotor eccentricity, means connected to said groups to isolate the average output of said coils, and means connected to and energized by said isolating means to sense said mean output as a function of rotor speed.

4. An alinement and speed error sensing system for a rotating body comprising a multi-lobed rotor of magnetic material on the body, a stator embracing said rotor with respect to which the rotor may at times rotate on an eccentric axis, a plurality of generating coils secured to and spaced around and within said stator, each having a pole piece, said rotor lobes moving across said pole pieces during rotor rotation, D. C. power means connected to excite said coils thus to induce magnetism in said rotor whereby, as said lobes move across said pole pieces said coils generate electrical pulses, means interconnecting groups of said coils in series, one group lying opposite a second group, a third group overlapping said first two groups and a fourth group lying opposite said third group and overlapping said first two groups, means connecting the first two groups together in electrical opposition, means connecting the last two groups together in electrical opposition, means connected to said groups to indicate the net output of said connected groups as a function of rotor eccentricity, means connected to said groups to isolate the average output of said coils which output represents a function of speed, an overspeed control, and means connected to said isolating means responsive to a finite value of said average output to actuate said overspeed control.

5. An alinement error sensing system for a rotating body comprising a multi-lobed rotor of magnetic material concentric with the body, a stator embracing the rotor and normally concentric therewith, but with respect to which the rotor becomes eccentric upon misalignment of said body, a plurality of generating coils spaced around and secured within said stator each having a pole-piece disposed in magnetic relation to said lobes as said lobes pass the pole pieces during body rotation, there being half as many lobes as there are coils and pole pieces, D. C. power means for exciting opposite coils for exciting said rotor magnetically for the same generating polarity, generation-responsive means, and means connecting opposite coils to said generation-responsive means.

6. An alinement error sensing system for a rotating body comprising a multi-lobed rotor of magnetic material concentric with the body, a stator embracing the rotor and normally concentric therewith, but with respect to which the rotor becomes eccentric upon misalinement of said body, a plurality of generating coils spaced around and secured within said stator each having a pole-piece disposed in magnetic relation to said lobes as said lobes pass the pole pieces during body rotation, there being half as many lobes as there are coils and pole pieces, D. C. power means for exciting opposite coils for exciting said rotor magnetically for the same generating polarity, generation-responsive means, and means connecting opposite coils to said generation-responsive means, said opposite coils being connected in pluralities of groups around said stator for sensitivity to misalinement of said rotating body with respect to different segments of said stator.

7. An alinement error sensing system for a rotating body comprising a multi-lobed rotor of magnetic material concentric with the body, a stator embracing the rotor and normally concentric therewith, but with respect to which the rotor becomes eccentric upon misalinment of said body, a plurality of generating coils spaced around and secured within said stator each having a pole-piece disposed in magentic relation to said lobes as said lobes pass the pole pieces during body rotation, there being half as many lobes as there are coils and pole pieces, D. C. power means for exciting opposite coils for exciting said rotor magnetically for the same generating polarity, generation-responsive means, and means connecting opposite coils to said generation-responsive means, and means connected to said coils to filter out direct current components of the output of said coils and to regulate generator output to a function of rotor eccentricity.

8. An alinement error sensing system for a rotating body comprising a multi-lobed rotor of magnetic material concentric with the body, a stator embracing the rotor and normally concentric therewith, but with respect to which the rotor becomes eccentric upon misalinement of said body, a plurality of generating coils spaced around and secured within said stator each having a pole-piece disposed in magnetic relation to said lobes as said lobes pass the pole pieces during body rotation, there being half as many lobes as there are coils and pole pieces, D. C. power means for exciting opposite coils for exciting said rotor magnetically for the same generating polarity, generation-responsive means, means connecting opposite coils to said generation-responsive means, means connected to said coils to filter out direct current components of the output of said coils and to regulate coil output to a function of rotor eccentricity, and means connected to rectify and average the alternating current output of said coils, said generation-responsive means comprising a voltmeter.

References Cited in the file of this patent

UNITED STATES PATENTS

| | | |
|---|---|---|
| 1,823,326 | Legg | Sept. 15, 1931 |
| 2,303,424 | Bendz | Dec. 1, 1942 |
| 2,531,414 | Engvall | Nov. 28, 1950 |

FOREIGN PATENTS

| | | |
|---|---|---|
| 641,732 | Great Britain | Aug. 16, 1950 |
| 666,898 | Great Britain | Feb. 20, 1952 |